United States Patent [19]

Komai et al.

[11] Patent Number: 5,403,601
[45] Date of Patent: Apr. 4, 1995

[54] MIGRATION-RESISTANT FAT COMPOSITION AND NUT-FLAVORED FILLING USING SAID FAT COMPOSITION

[75] Inventors: Hideki Komai, Sennan; Tsugio Nishimoto, Naga; Junko Shinkawa, Takaishi, all of Japan

[73] Assignee: Fuji Oil Company, Ltd., Osaka, Japan

[21] Appl. No.: 125,209

[22] Filed: Sep. 23, 1993

[51] Int. Cl.$^6$ ............................ A23D 9/00; A23P 1/08
[52] U.S. Cl. ........................................ 426/98; 426/99; 426/607; 426/633
[58] Field of Search ................ 426/606, 607, 632, 633, 426/99, 98

[56] References Cited

U.S. PATENT DOCUMENTS

| | | | |
|---|---|---|---|
| 3,317,325 | 5/1967 | Durst | 426/98 |
| 3,719,497 | 3/1973 | Galle | 426/98 |
| 3,872,229 | 3/1975 | Durst | 426/98 |
| 3,872,230 | 3/1975 | Sinner | 426/98 |
| 3,949,105 | 4/1976 | Wieske | 426/607 |
| 4,108,879 | 8/1978 | Minowa | 426/606 |
| 4,183,971 | 1/1980 | Minowa | 426/607 |
| 4,230,737 | 10/1980 | Heider | 426/607 |
| 4,260,643 | 4/1981 | Cochran | 426/606 |
| 4,288,378 | 9/1981 | Japikse | 426/633 |
| 4,317,840 | 3/1982 | Sortwell | 426/606 |
| 4,386,111 | 5/1983 | Van Herteren | 426/607 |
| 4,394,392 | 7/1983 | Tresser | 426/606 |
| 4,396,633 | 8/1983 | Tresser | 426/606 |
| 4,430,350 | 2/1984 | Tresser | 426/607 |
| 4,902,527 | 2/1990 | Galenkamp | 426/607 |
| 4,942,055 | 7/1990 | Avera | 426/633 |
| 4,960,600 | 10/1990 | Kester | 426/98 |
| 5,002,802 | 3/1991 | Gannis | 426/99 |
| 5,064,670 | 11/1991 | Hershorn | 426/607 |
| 5,215,780 | 6/1993 | Meidenbauer | 426/99 |

*Primary Examiner*—Carolyn Paden
*Attorney, Agent, or Firm*—Wenderoth, Lind & Ponack

[57] ABSTRACT

There is disclosed a migration-resistant fat composition having an iodine value of 35 to 60; a trans acid content of 30% to 50%; a melting point of 40° C. to 55° C.; a solid fat content of not less than 85% at 20° C.; not less than 60% at 30° C., not less than 30% at 40° C., and not more than 3% at 50° C.; and a trans acid/saturated fatty acid content ratio of 0.5 to 2.0. Also disclosed is a nut-flavored filling including 5% to 20% migration-resistant fat composition as recited above and at least 20% nut paste having a fat content of at least 40%, the total content of the fat composition and the nut paste being not greater than 100%.

3 Claims, 1 Drawing Sheet

MIGRATION-RESISTANT FAT COMPOSITION AND NUT-FLAVORED FILLING USING SAID FAT COMPOSITION

FIELD OF THE INVENTION

The present invention relates to a migration-resistant fat composition. More particularly, it relates to a migration-resistant fat composition that is useful as an ingredient of cream preparations, particularly containing a large amount of nut paste, to be put into the chocolate center or to be sandwiched between two pieces of baked confectionery such as biscuits and cookies. The present invention also relates to a nut-flavored filling using the migration-resistant fat composition.

BACKGROUND OF THE INVENTION

Among the ingredients of cream preparations to be put into the chocolate center or to be sandwiched between two pieces of baked confectionery such as biscuits and cookies, there has hitherto been widely used nut paste as a flavoring material. When nut paste having a high oil content is used at large amounts, however, low-melting fat ingredients contained in the paste (e.g., at least 95% of almond oil is composed of oleic acid and linoleic acid) will migrate in the chocolate layer or in the baked cereal layer, thereby causing the deformation of products as well as the quality deterioration such as a change in the quality and a change in the sense of eating.

To eliminate these defects, various attempts have been made; for example, (a) high-melting fractions of unhydrogenated palm oil are mixed with peanut butter to prepare a cream preparation (see, e.g., JP-A 50-71865) and (b) a mixture of hydrogenated palm oil and peanut oil is added to a cream preparation (see, e.g., JP-A 53-139748). For use in nut-flavored fillings, however, satisfactory effects cannot be obtained. In particular, method (a) gives the flavor of peanut to the cream composition; therefore, its applications are inevitably restricted to the production of peanut-flavored confectionery.

SUMMARY OF THE INVENTION

Under these circumstances, the present inventors have intensively studied to develop a migration-resistant fat composition. As the result, they have found that a fat composition having specified physicochemical properties can suppress the fat migration and exhibit excellent melting properties in a mouth, even when nut paste having a high oil content is used as a major ingredient of cream preparations to be put into the chocolate center or to be sandwiched between two pieces of baked confectionery, thereby completing the present invention.

Thus, the present invention provides a migration-resistant fat composition characterized in that it has an iodine value of 35 to 60; a trans acid content of 30% to 50%; a melting point of 40° C. to 55° C.; a solid fat content of not less than 85% at 20° C., not less than 60% at 30° C., not less than 30% at 40° C., and not more than 3% at 50° C.; and a trans acid/saturated fatty acid content ratio of 0.5 to 2.0.

Also provided is a nut-flavored filling characterized in that it comprises 5% to 20% migration-resistant fat composition as recited above and at least 20% nut paste having a fat content of at least 40%, the total content of the fat composition and the nut paste being not greater than 100%.

DETAILED DESCRIPTION OF THE INVENTION

Figure 1:
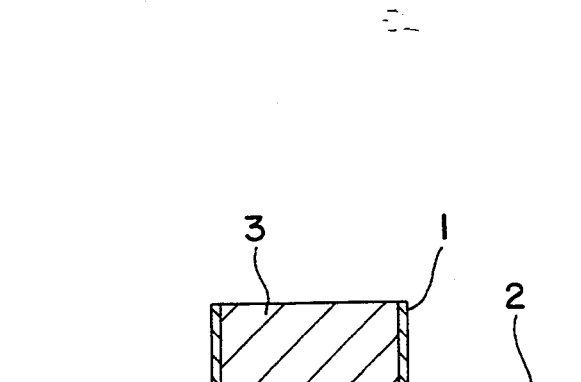
FIG. 1 is a schematic sectional view of a metal ring placed on a sheet of filter paper, which is used for the fat migration test.

The migration-resistant fat composition of the present invention can be produced by the elaidinization of a liquid fat with a catalyst, and if necessary, by the subsequent fractionation or the blending of at least two fractionated oils, so as to have an iodine value of 35 to 60; a trans acid content of 30% to 50%; a melting point of 40° C. to 55° C.; a solid fat content of not less than 85% at 20° C.; not less than 60% at 30° C., not less than 30% at 40° C., and not more than 3% at 50° C.; and a trans acid/saturated fatty acid content ratio of 0.5 to 2.0. In particular, it is preferred that the solid fat content is not less than 90% at 20° C., not less than 70% at 30° C., not less than 35% at 40° C., and not more than 3% at 50° C., because the fat composition can exhibit excellent characteristics in which the suppression of fat migration and the melting properties in a mouth are harmonized with each other. Here, the term "acid content", as used in "trans acid content" and "trans acid/saturated fatty acid content ratio", means the content of constituent fatty acids or acid residues, not free fatty acids, in the fat composition.

Examples of the liquid fat are palm oil, rapeseed oil, soybean oil, corn oil, cotton seed oil and rice bran oil. These liquid fats can be used solely or in combination. Examples of the catalyst are sulfur-poisoned nickel catalysts, and ordinary nickel catalysts combined with sulfur-containing amino acids such as methionine, S-adenosilmethionine, cysteine or glutathione; biotin; sulfur-containing vitamins such as thiamine; or natural isothiocyanate compounds such as aryl mustard seed oil.

When the solid fat content is less than 85% at 20° C., satisfactory migration resistance cannot be attained, and the fat composition will tend to migrate to the covering chocolate or to the dough for baked confectionery. To the contrary, when the solid fat content exceeds 3% at 50° C., the melting properties in a mouth will become deteriorated, so that a sense of incongruity is given to the material in the chocolate center.

Also when the trans acid content is less than 30% and the trans acid/saturated fatty acid content ratio is less than 0.5, the same disadvantages will occur on the melting properties in a mouth, as described for the solid fat content. To the contrary, when the trans acid content exceeds 50% or the trans acid/unsaturated fatty acid content ratio exceeds 2.0, satisfactory migration resistance cannot be attained. The trans acid content is preferably in the range of 33% to 50%.

The migration-resistant fat composition of the present invention is preferably used as an ingredient of nut-flavored fillings (e.g., nut paste-containing cream preparations). The nut paste can be prepared, for example, by roasting high oil content nuts and then by braying the roasted nuts into a paste form with a known means of braying, such as a triple roll mill. Examples of the high oil content nuts are peanuts, almonds, cashew nuts, hazelnuts, pistachio nuts, macadamia nuts, pecan nuts, and walnuts. The nut paste thus obtained has an oil content of about 50% to 60% on an average, with the maximum oil content amounting to 75% when pecan nuts are used.

The nut-flavored filling of the present invention can be produced by blending 5% to 20% migration-resistant fat composition and at least 20% nut paste having a fat content of at least 40% with a base material consisting of sugar, powdered milk, and if necessary, other ingredients.

When the amount of fat composition is less than 5%, fat migration cannot be satisfactorily suppressed. To the contrary, when the amount thereof exceeds 20%, the melting properties and the sense of eating will become deteriorated.

The migration-resistant fat composition of the present invention has a high melting point of 40° C. to 55° C., although it has a stearic acid content of 35% or less. The fat composition has a high content of trans acids (mainly, trans-9-octadecenoic acid or elaidic acid having a melting point of 44° C. to 45° C.) and it does not contain a large amount of trisaturated fatty acids as the case of extremely hardened rapeseed oil; therefore, the melting properties in a mouth are scarcely inhibited. It is also possible to improve the heat resistance and to suppress the fat migration by addition of the migration-resistant fat composition at small amounts.

The present invention will be further illustrated by way of the following examples, which are not to be construed to limit the scope thereof.

EXAMPLE 1

Palm olein (i.e., low melting fraction of palm oil) having an iodine value of 68.2 was subjected to elaidinization with 0.3% sulfur poisoned nickel catalyst under a hydrogen pressure of 1 kg/cm$^2$ at 195° C., thereby obtaining a migration-resistant fat composition of the present invention.

The fat composition thus obtained (hereinafter referred to as Fat Comp. I) had an iodine value of 54.5, an melting point of 37.3° C., and a trans acid content of 42%. The solid fat content and the trans acid/saturated fatty acid content ratio of this fat composition are shown in Table 1.

To 20 parts by weight of Fat Comp. I, there were added 80 parts by weight of n-hexane. The mixture was heated to form a solution, which was then gradually cooled to cause crystal deposition. The deposited crystal portion was filtered off, and the solvent contained therein was removed, thereby obtaining a high melting fraction, as another migration-resistant fat composition of the present invention. The yield was 15%.

The fat composition thus obtained (hereinafter referred to as Fat Comp. II) had an iodine value of 40, a melting point of 46° C., and a trans acid content of 38%. The solid fat content and the trans acid/saturated fatty acid content ratio of this fat composition are shown in Table 1.

TABLE I

| Sample | Solid fat content (%) | | | | Trans acid/saturated fatty acid content ratio (%) |
| --- | --- | --- | --- | --- | --- |
| | 20° C. | 30° C. | 40° C. | 50° C. | |
| Fat Comp. I | 82.3 | 43.9 | 3.1 | 0.0 | 1.1 |
| Fat Comp. II | 96.2 | 87.8 | 40.9 | 0.0 | 0.6 |

Fat Comps. I and II were examined for fat migration when used as an ingredient of cream preparations.

Each of Fat Comps. I and II was blended at a ratio of 6.0% with 61.8% peanut paste having a fat content of at least 40% and 32.2% sugar to form a nut-flavored cream preparation. As a control, a nut-flavored cream preparation containing no fat composition was prepared by blending 72.7% peanut paste having a fat content of at least 40% with 27.3% sugar.

The nut-flavored cream preparations thus obtained were subjected to the following fat migration test.

As shown in FIG. 1, a metal ring 1 of 18 mm in inner diameter and 6 mm in depth was placed on a sheet of filter paper 2, and the inner space of the metal ring 1 was filled with a sample cream preparation 3. The ambient temperature was raised to a specified one, at which the metal ring 1 containing the sample cream preparation 3 was allowed to stand for 18 hours, and the amount of fat having migrated to the filter paper 2 was measured. The results are shown in Table 2.

TABLE 2

| Sample | Amount of fat having migrated (mg) at | | | | |
| --- | --- | --- | --- | --- | --- |
| | 15° C. | 20° C. | 25° C. | 27.5° C. | 30° C. |
| Control (with no fat comp.) | 115 | 120 | 120 | 125 | 145 |
| Cream using Fat Comp. I | 85 | 85 | 90 | 105 | 130 |
| Cream using Fat Comp. II | 15 | 15 | 15 | 32 | 55 |

As can be seen from Table 2, Fat Comp. I, although it is unfractionated, has a significant good effect on the suppression of fat migration as compared with the control, and Fat Comp. II has extremely excellent migration resistance.

EXAMPLE 2

Soybean oil having an iodine value of 134 was isomerized by hydrogenation in the same manner as described in Example 1, thereby obtaining an elaidinized oil having a trans acid content of 55%, an iodine value of 72, and a melting point of 37.5° C. The elaidinized oil was fractionated in the same manner as described in Example 1, thereby obtaining two kinds of migration-resistant fat compositions of the present invention.

The yield and physicochemical properties of each of the fat compositions thus obtained (hereinafter referred to as Fat Comps. III and IV) are shown in Tables 3 and 4.

TABLE 3

| Sample | Yield (%) | Iodine value | mp. (°C.) | $C_{18}$ acid[1] (%) | Trans acid[2] (%) |
| --- | --- | --- | --- | --- | --- |
| Fat Comp. III | 15 | 46.2 | 49.2 | 31.1 | 35 |
| Fat Comp. IV | 25 | 55.1 | 46.1 | 22.0 | 42 |

[1]$C_{18}$ saturated fatty acid content.
[2]Trans acid content.

TABLE 4

| Sample | Solid fat content | | | | Trans/saturated acid content ratio (%) |
| --- | --- | --- | --- | --- | --- |
| | 20° C. | 30° C. | 40° C. | 50° C. | |
| Fat Comp. III | 96.3 | 88.9 | 49.3 | 2.5 | 1.5 |
| Fat Comp. IV | 96.0 | 87.5 | 36.2 | 0.0 | 1.8 |

Each of Fat Comps. III and IV was used to prepare a nut-flavored cream preparation, which was then examined for fat migration in the same manner as described in Example 1. The results are shown in Table 5.

TABLE 5

| Sample | Amount of fat having migrated (mg) at | | | | |
| --- | --- | --- | --- | --- | --- |
| | 15° C. | 20° C. | 25° C. | 27.5° C. | 30° C. |
| Control (with no fat comp.) | 115 | 120 | 120 | 125 | 145 |
| Cream using Fat Comp. III | 15 | 15 | 20 | 25 | 30 |
| Crewn using Fat Comp. IV | 15 | 15 | 25 | 25 | 45 |

As can be seen from Table 5, both Fat Comps. III and IV exhibited excellent migration resistance. As compared with the cream preparation using Fat Comp. IV, the cream preparation using Fat Comp. III was slightly stiffer and was felt, when ate, to be rather harder. It seems that this is because of a difference in their melting points and $C_{18}$ saturated fatty acid contents.

EXAMPLE 3

Figure 2:
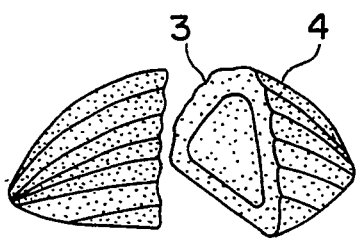
FIG. 2 is a perspective view of a shell chocolate used for the preservation test, the chocolate being vertically cut into two parts for the purpose of showing the chocolate center.

Each of the nut-flavored cream preparations obtained in Examples 1 and 2 was used as a filling to be put into the chocolate center, thereby preparing a shell chocolate as shown in FIG. 2. The shell chocolate was composed of the nut-flavored cream preparation 3 in the chocolate center and the chocolate shell layer 4. Such a shell chocolate can be prepared according to an ordinary process known in the art.

The shell chocolates thus obtained were subjected to the preservation test in which a cycle of temperature rise and drop (17° C. for 11.5 hours⇌28° C. for 11.5 hours) was repeated. The results obtained after the duration of one week are shown in Table 6.

TABLE 6

| Sample | Degree of depression[1] | Sense of eating of chocolate center | Total judgement[2] |
| --- | --- | --- | --- |
| Control (with no fat comp.) | +++ | poor | D |
| Chocolate using Fat Comp. I | + | poor | C |
| Chocolate using Fat Comp. II | − | good melting | A |
| Chocolate using Fat Comp. III | − | slightly slow melting | B |
| Chocolate using Fat Comp. IV | − | good melting | A |

Figure 3:
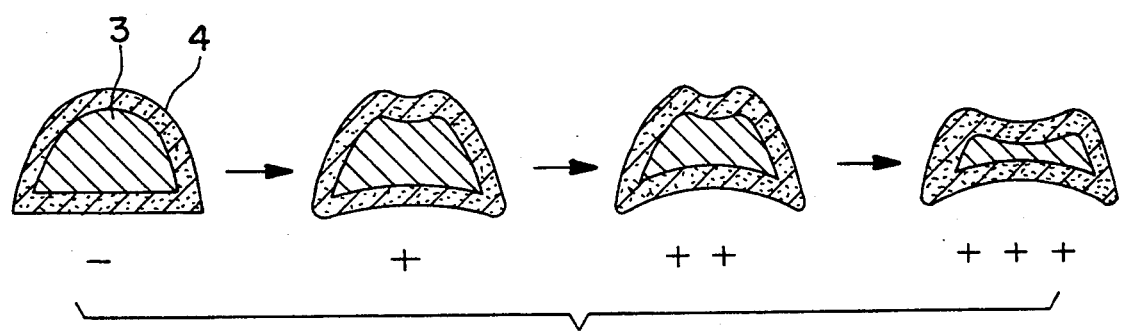
FIG. 3 is a series of sectional views of the shell chocolate showing a change in its shape (i.e., depression) observed during the preservation test.

[1] Criteria: −, no depression; +, slight depression; ++, moderate depression; and +++, heavy depression (see FIG. 3).
[2] Criteria: A, excellent; B, good; C, fair; and D, poor.

As can be seen from Table 6, the shell chocolate using Fat Comps. II, III, or IV exhibited no depression, and the shell chocolate using Fat Comp. I exhibit only slight depression. This is because these fat compositions had excellent migration resistance. In addition, the shell chocolate using Fat Comps. II, III, or IV had good melting properties in a mouth when ate, although the melting of the shell chocolate using Fat Comp. III was felt to be slightly slow.

What is claimed is:

1. A migration-resistant fat composition having an iodine value of 35 to 60; a trans acid content of 30% to 50%; a melting point of 40° C. to 55° C.; a solid fat content of not less than 85% at 20° C.; not less than 60% at 30° C., not less than 30% at 40° C., and not more than 3% at 50° C.; and a trans acid/saturated fatty acid content ratio of 0.5 to 2.0.

2. A migration-resistant fat composition according to claim 1, wherein the solid fat content is not less than 90% at 20° C., not less than 70% at 30° C., not less than 35% at 40° C., and not more than 3% at 50° C.

3. A nut-flavored filling comprising 5% to 20% migration-resistant fat composition as recited in claim 1, and at least 20% nut paste having a fat content of at least 40%, the total content of said fat composition and said nut paste being not greater than 100%.

* * * * *